(12) United States Patent
Button

(10) Patent No.: US 7,647,866 B2
(45) Date of Patent: Jan. 19, 2010

(54) GRIDDLE FOR COOKING AND PREPARING FOODS

(76) Inventor: John Edwin Button, 38310 Phylllis Ct., Sterling Heights, MI (US) 48312

( * ) Notice: Subject to any disclaimer, the term of this patent is extended or adjusted under 35 U.S.C. 154(b) by 485 days.

(21) Appl. No.: 11/516,466

(22) Filed: Sep. 6, 2006

(65) Prior Publication Data

US 2009/0101024 A1    Apr. 23, 2009

Related U.S. Application Data

(60) Provisional application No. 60/724,157, filed on Oct. 6, 2005.

(51) Int. Cl.
*A47J 37/10* (2006.01)

(52) U.S. Cl. .......................... 99/422; 99/339

(58) Field of Classification Search ............... 99/339, 99/400, 422–425, 494, 579, 375, 401, 426, 99/444–446, 447, 449, 450; 126/14, 25, 126/29, 30, 51, 41 R, 369, 474, 39 H, 39 N, 126/39 J, 39 K, 211, 212; 220/573.1; D7/363
See application file for complete search history.

(56) References Cited

U.S. PATENT DOCUMENTS

| | | | | |
|---|---|---|---|---|
| 1,201,138 A * | 10/1916 | Bingham | .................. | 126/376.1 |
| 1,961,391 A * | 6/1934 | Reedy et al. | ................... | 99/446 |
| 1,993,356 A * | 3/1935 | Berchman | ..................... | 99/446 |
| 5,237,914 A * | 8/1993 | Carstensen | ................... | 99/445 |
| 5,413,032 A * | 5/1995 | Bruno et al. | .................. | 99/331 |
| 5,524,528 A * | 6/1996 | Yeh | .............................. | 99/446 |
| 5,678,531 A * | 10/1997 | Byers et al. | ............... | 126/25 R |
| 5,911,812 A * | 6/1999 | Stanek et al. | ................. | 99/446 |
| 5,957,123 A * | 9/1999 | Addonizio et al. | ........ | 126/390.1 |
| 6,057,528 A * | 5/2000 | Cook | .......................... | 219/405 |
| D468,580 S * | 1/2003 | Ruiseco | ....................... | D7/355 |
| 6,640,695 B2 * | 11/2003 | Stark | ............................ | 99/447 |
| 6,736,051 B2 * | 5/2004 | Frantz et al. | .................. | 99/349 |
| 2002/0096056 A1* | 7/2002 | Hopkins | ...................... | 99/422 |
| 2005/0045170 A1* | 3/2005 | Lerner | .......................... | 126/30 |
| 2005/0204931 A1* | 9/2005 | Cheng | .......................... | 99/422 |
| 2007/0137499 A1* | 6/2007 | Leon et al. | .................... | 99/422 |

OTHER PUBLICATIONS

Photograph of Little Griddle brand griddle sold in 2001.

(Continued)

*Primary Examiner*—Tu B Hoang
*Assistant Examiner*—Hemant Mathew
(74) *Attorney, Agent, or Firm*—Young Basile

(57) ABSTRACT

A griddle for cooking and preparing foods and more specifically a griddle for use with a gas or a propane outdoor grill or barbeque. The griddle can include a cooking surface, a trip tray, a first sidewall, a rear wall, a second sidewall, a first cross brace, and a second cross brace. The first sidewall can include a first upper sidewall and a first lower sidewall. The rear wall can include an upper rear wall and a lower rear wall. The second sidewall can include a second upper sidewall and a second lower sidewall. The griddle can include at least one aperture located in each of the first lower sidewall, the lower rear wall, the second lower sidewall, the first cross brace, and the second cross brace. The griddle can be made of a metal, which can be a stainless steel.

6 Claims, 5 Drawing Sheets

OTHER PUBLICATIONS

One (1) page advertisement brochure of Griddle -Q brand griddle sold in 2002.

One (1) page advertisement of Griddle-Q brand griddle sold in 2003.

Two (2) pages of advertisement for Griddle-Q brand griddle sold before Oct. 6, 2004.

One (1) page photograph of Griddle-Q brand griddle sold before Oct. 6, 2004.

* cited by examiner

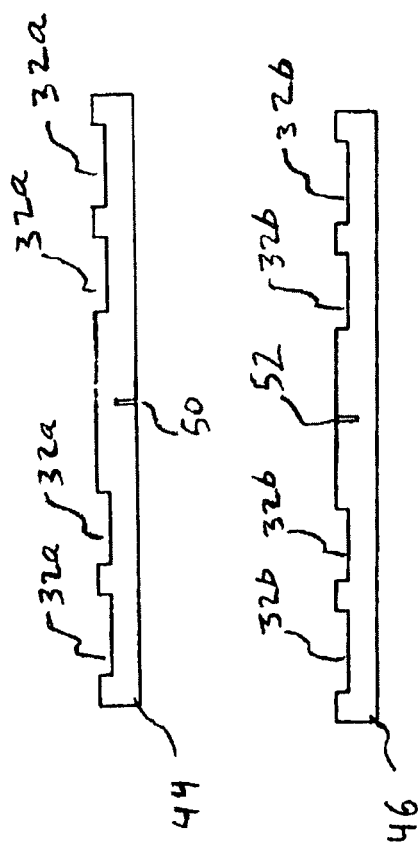
FIG. 6A
FIG. 6B
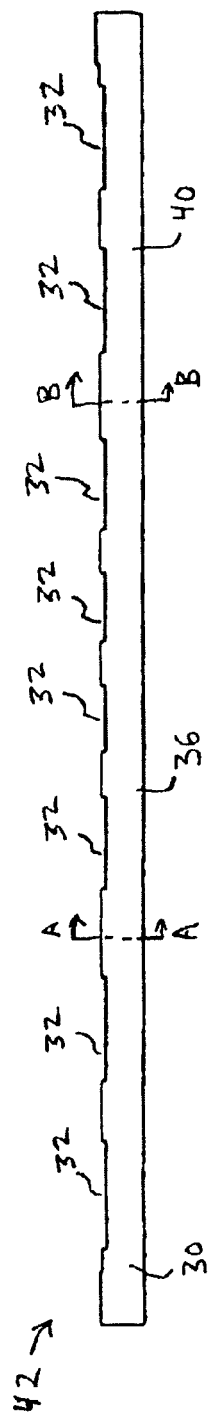
FIG. 7

GRIDDLE FOR COOKING AND PREPARING FOODS

CROSS REFERENCE TO RELATED APPLICATIONS

This invention claims priority of Provisional Patent Application Ser. No. 60/724,157 filed on Oct. 6, 2005 incorporated herein by reference in its entirety.

FIELD OF THE INVENTION

This invention relates to a griddle for cooking and preparing foods and more specifically a stainless steel griddle for use with a gas or a propane outdoor grill or barbeque.

BACKGROUND OF THE INVENTION

When cooking or preparing food outdoors using, for example, a gas or propane outdoor grill or barbeque, there are foods which cannot be placed or easily placed directly on the cooking surface of the grill. Some examples include stir fry, tofu, eggs, hash browns, pancakes, most fish, and many vegetables.

When cooking such foods, it becomes necessary to use, for example, aluminum foil placed on the cooking surface of the grill. However, cooking on aluminum foil has drawbacks. The drawbacks of cooking on aluminum foil include its relative flimsiness in addition to possible health concerns associated with aluminum. Another alternative is to use a pot or a pan on a side burner of the grill, if the grill is so equipped. However, this requires one to have a grill with a side burner. Additionally, using another burner increases fuel consumption.

Thus, it would be advantageous to be able to cook any food on a gas or propane grill or barbeque without using aluminum foil or a side burner.

SUMMARY

The present invention is a griddle for cooking and preparing foods and more specifically a griddle for use with a gas or a propane outdoor grill or barbeque. The griddle includes a cooking surface, a drip tray, a first sidewall, a rear wall, a second sidewall, a first cross brace, and a second cross brace. The griddle is formed from a stainless steel material.

The drip tray includes a front wall, a bottom, and a rear wall. The front wall, the bottom, and the rear wall of the drip tray are sealingly attached to the first sidewall and to the second sidewall. The drip tray is integrally formed with the cooking surface.

The first sidewall includes a first upper sidewall and a first lower sidewall. The first upper sidewall is integrally formed with the cooking surface. The first lower sidewall includes at least one aperture to allow flow of heat and of oxygen beneath the griddle.

The rear wall includes an upper rear wall and a lower rear wall. The upper rear wall is integrally formed with the cooking surface. The lower rear wall includes at least one aperture to allow flow of heat and oxygen beneath the griddle.

The second sidewall includes a second upper sidewall and a second lower sidewall. The second upper sidewall is integrally formed with the cooking surface. The second lower sidewall includes at least one aperture to allow flow of heat and of oxygen beneath the griddle.

The first cross brace and the second cross brace each include at least one aperture to allow flow of heat and of oxygen beneath the griddle.

BRIEF DESCRIPTION OF THE DRAWING

The description herein makes reference to the accompanying drawings wherein like reference numerals refer to like parts throughout the several views, and wherein:

FIGS. 6A and 6B are side elevational views of a first cross-brace and a second cross brace, respectively, of the griddle; and FIG. 7 is a side elevational view of a lower band of the griddle.

DETAILED DESCRIPTION

Figure 1:
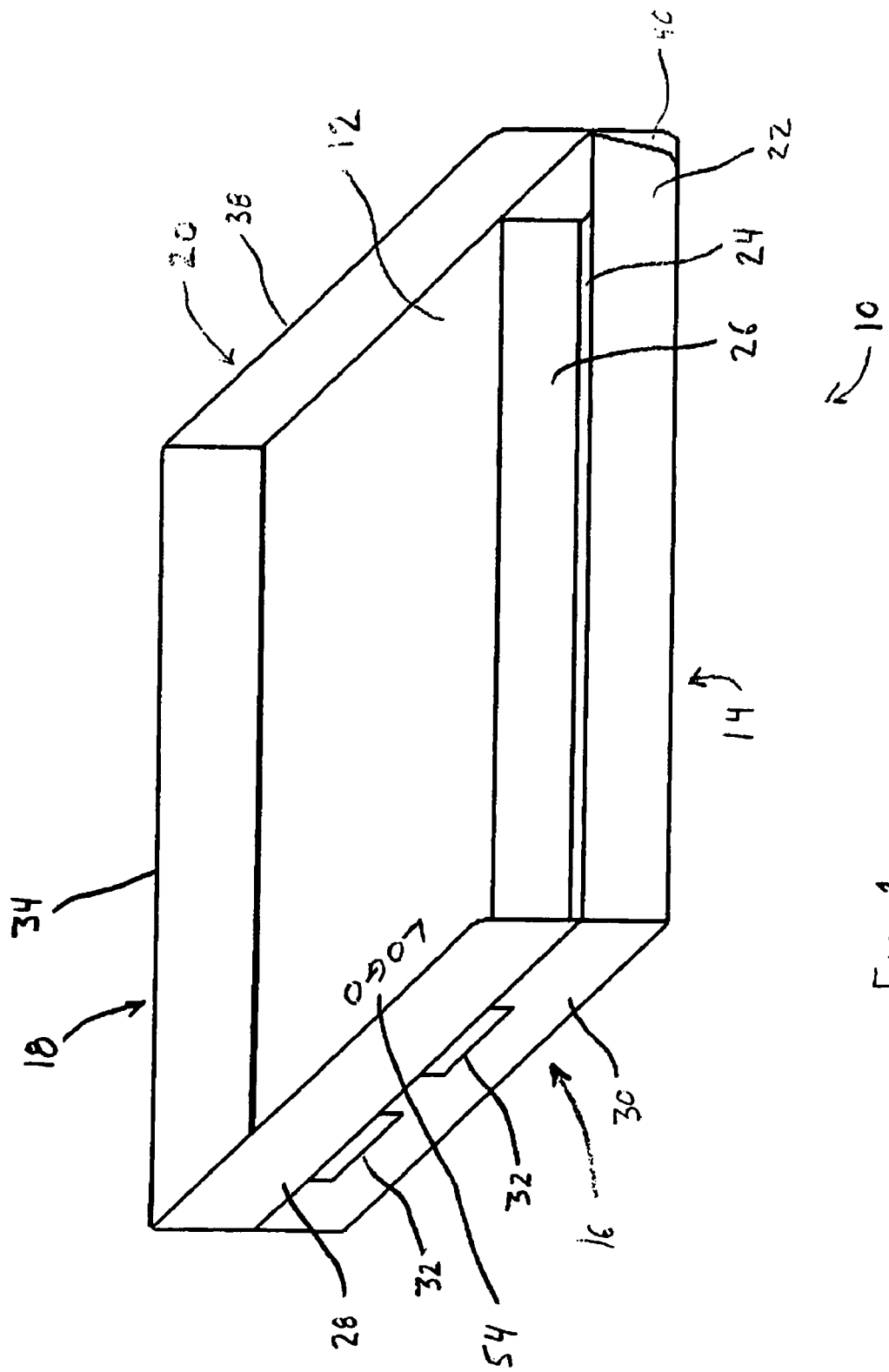
FIG. 1 is a front perspective view of a griddle for cooking foods.

Referring to FIGS. 1-7 of the drawing, there is depicted one aspect of a griddle 10 suitable for cooking and preparing food on a grill or a barbeque. The griddle 10 includes a generally rectangular cooking surface 12 and a catch or drip tray 14. The griddle 10 also includes a first or left sidewall 16, a rear wall 18, and a second or right sidewall 20.

As best seen in FIGS. 1-2 and 4-5, the drip tray 14 includes a front wall 22, a bottom 24 and a rear wall 26. The purpose of the drip tray 14 is to keep fats and oils from cooking, for example, out of the grill or the barbeque beneath the griddle 10. The drip tray 14 can be integrally formed with the cooking surface 12 using a metal forming press or any other such suitable method as is known in the industry.

Now referring to FIGS. 1-4, the first sidewall 16 includes a first upper sidewall 28 and a first lower sidewall 30. The first upper sidewall 28 is sealingly attached to the cooking surface 12. The first upper sidewall 28 can be integrally formed with the cooking surface 12 using a metal forming press or any other such suitable method as is known in the industry. The first upper sidewall 28 prevents food from falling or spilling off the cooking surface 12 of the griddle 10.

The first lower sidewall 30 includes at least one aperture or slot 32. The at least one slot 32 is generally rectangular shaped and is located proximate to the cooking surface 12. The slot 32 allows heat to flow evenly beneath the cooking surface 12 and also allows oxygen to flow beneath the griddle 10 to the grill or the barbeque. This flow of heat and of oxygen promotes uniform cooking of the food on the cooking surface 12. The first lower sidewall 30 is sealingly attached to the front wall 22, the bottom 24, and the rear wall 26 of the drip tray 14.

The rear wall 18 of the griddle 10 includes an upper rear wall 34 and a lower rear wall 36. The upper rear wall 34 is sealingly attached. The upper rear wall 34 can be integrally formed with the cooking surface 12 using a metal forming press or any other such suitable method as is known in the industry. The upper rear wall 34 prevents food from falling off the rear of the cooking surface 12 of the griddle 10. The lower rear wall 36 includes at least one slot 32 located proximate to the cooking surface 12 to allow for flow of heat and oxygen beneath the cooking surface 12 and the griddle 10.

The second sidewall 20 includes a second upper sidewall 38 and a second lower sidewall 40. The second upper sidewall 38 is sealingly attached to the cooking surface 12. The second upper sidewall 38 can be integrally formed with the cooking surface 12 using a metal forming press or any other such suitable method as is known in the industry. The second upper sidewall 38 prevents food from falling or spilling off the cooking surface 12 of the griddle 10.

The second lower sidewall 40 includes at least one slot 32 located proximate to the cooking surface 12 to allow for flow of heat and oxygen beneath the cooking surface 12 and the griddle 10. The second lower sidewall 40 is sealingly attached to the front wall 22, the bottom 24, and the rear wall 26 of the drip trap 14.

Referring to FIG. 7, the first lower sidewall 30, the rear lower wall 36, and the second lower sidewall 40 comprise a lower band 42. The lower band 42 including the first lower sidewall 30, the rear lower wall 36, and the second lower sidewall 40 is formed from a piece of sheet strip metal, for example. The lower band 42 is then bent along lines A-A and B-B to generally form three sides of a rectangle. The lower band 42 is then attached to the cooking surface 12. The lower band can be attached to the cooking surface 12 by MIG welding or any other suitable method as is known in the industry.

Figure 2:
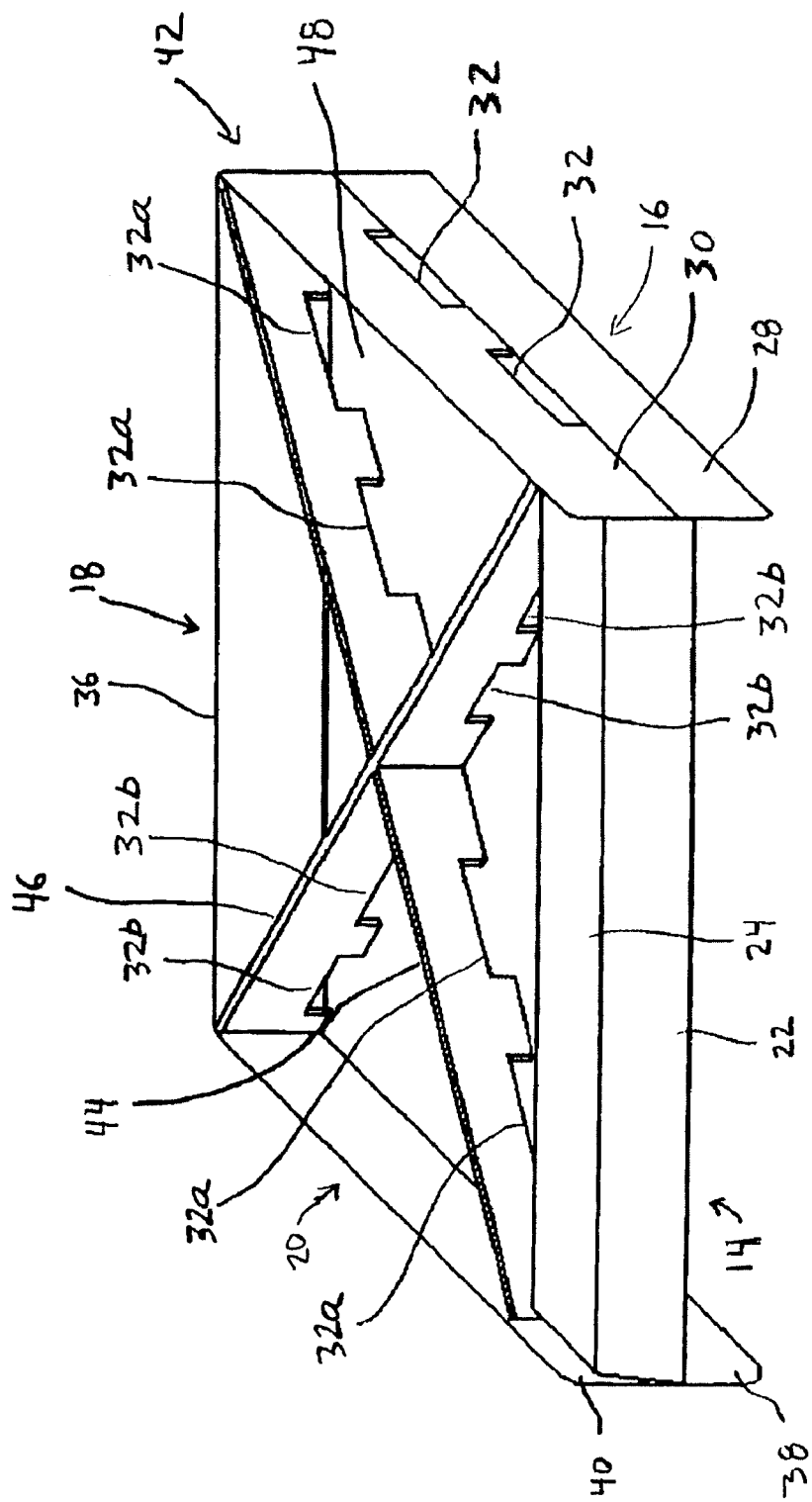
FIG. 2 is a bottom perspective view of the griddle.
Figure 3:
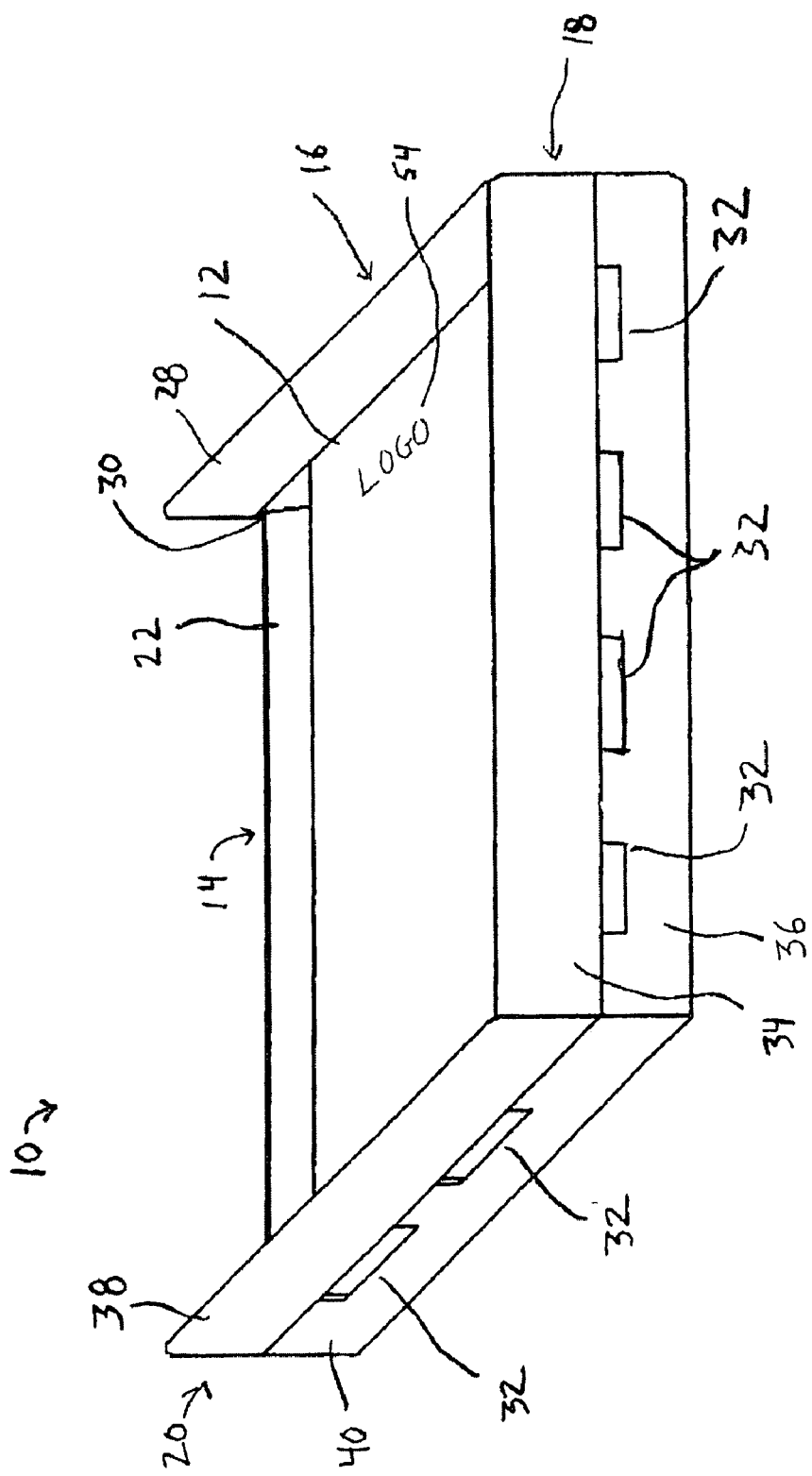
FIG. 3 is a rear perspective view of the griddle.
Figure 5:
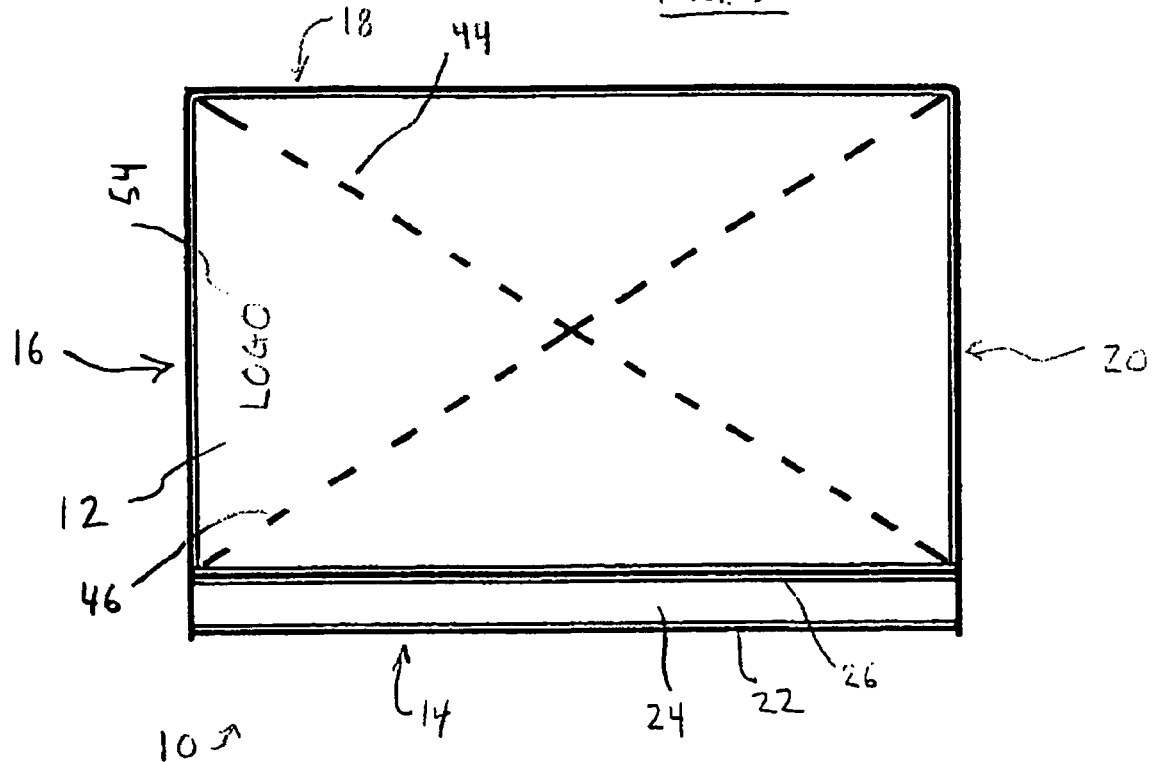
FIG. 5 is a top elevational view of the griddle.
Figure 4:
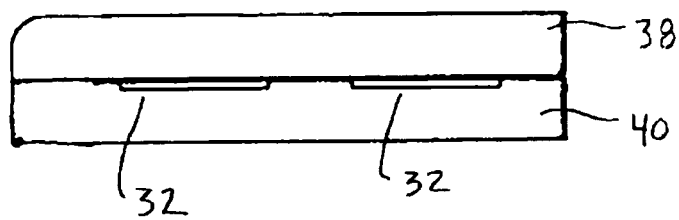
FIG. 4 is a side elevational view of the griddle.

As best illustrated in FIGS. 2 and 5-6, the griddle 10 includes a first cross brace 44 and a second cross brace 46. The first cross brace 44 and the second cross brace 46 are shown in hidden lines in FIG. 5. The first cross brace 44 and the second cross brace 46 are attached to a bottom surface 48 of the cooking surface 12 and are attached to the first lower sidewall 30, the lower rear wall 36, and the second lower sidewall 40. The first cross brace 44 and the second cross brace 46 each include at least one slot 32a and 32b respectively located proximate to the bottom surface 48.

The first cross brace 44 and the second cross brace 46 are arranged in a generally X-shaped formation. An aperture or slot 50 of the first cross brace 44 is interlockingly received by an aperture or slot 52 of the second cross brace 46. The first cross brace 44 and the second cross brace 46 can be attached to the bottom surface 48, the first lower sidewall 30, the lower rear wall 36, the second lower sidewall 40, and to each other by MIG welding or any other suitable method as is known in the industry. The first cross brace 44 and the second cross brace 46 prevent twisting or warping of the griddle 10 and the griddle surface 12 and increase rigidity of the griddle surface 12.

Now referring to FIG. 5, the cooking surface 12 can include a logo or branded area 54. The logo area 54 can be, for example, embossed with a logo of a manufacturer of the griddle 10 or of a customer of the griddle 10.

The griddle 10 is preferably formed of a non-reactive metal material, which can be, for example, a steel. The steel more particularly can be a stainless steel, which can be, by way of example and not limitation, stainless steel sheet. The material description can be, for example, 430-2B cooking grade stainless steel. The material thickness can be 14-gauge or 0.075 inches with a tolerance of plus or minus 0.005 inches. The material of the griddle 10 preferably allows a cooking range approximately from 150 to 400 degrees Fahrenheit.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A griddle for cooking foods on an outdoor grill or barbeque comprising:

an uncovered open air cooking surface having an opposing bottom surface positioned above a heating source independent of the griddle;

a first upper sidewall, a second tipper sidewall and a upper rear wall positioned between the first and second upper sidewalls, the first, the second and the rear upper sidewalls are integral with and extend upwardly from the cooking surface;

a first lower sidewall, a second lower sidewall and a lower rear wall positioned between the first and second lower sidewalls, the first lower sidewall, the second lower sidewall and lower rear wall are independent and separate from the respective first, second and rear upper sidewalls adjacent the cooking surface, the first lower sidewall, the second lower sidewall and the lower rear wall are connected to and extend below the bottom surface for elevating the cooking surface above the independent heating source and forming a periphery having peripheral edges, the peripheral edges defining a cavity beneath the bottom surface and open to the independent heating source, said first lower sidewall, second lower sidewall and lower rear wall each having an elongate open heat dissipating exhaust slot therethrough positioned directly adjacent to and opening to the bottom surface for actively drawing heat upward from the independent heating source into the cavity toward the bottom surface of the cooking surface to increase concentration and even distribution of heat on the cooking surface;

a pair of braces arranged in an X-shaped formation extend between opposing peripheral edges of the cavity, each brace of the pair of braces defining at least four slots separated along a length of the brace and open to the cooking surface opposing bottom surface, each brace is connected to the bottom surface between adjacent slots in the brace for increasing the rigidity of the cooking surface and to further promote the active drawing, concentration and even distribution of heat toward the bottom surface while promoting dissipation of excess heat to escape through the exhaust slots; and a drip tray located opposite of the rear wall and integrally formed with the cooking surface, said drip tray having a front wall, a bottom wall and a rear wall and wherein portions of the first lower sidewall and the second lower sidewall form sidewalls for the drip tray.

2. The griddle of claim 1, wherein the first lower sidewall and the second lower sidewall are sealingly attached to the front wall, the bottom wall and the rear wall of the drip tray.

3. The cooking griddle of claim 1 wherein the cooking surface is substantially rectangular shaped.

4. The griddle of claim 1 wherein:

each brace of the pair of braces further comprises a vertical through slot for interlocking receipt of the other opposing brace forming a substantially planer griddle bottom surface distant from the cooking surface for stable placement of the griddle on the independent heating source thereby elevating the cooking surface above the independent heating source.

5. The griddle of claim 1 wherein each of the first sidewall, the second sidewall and the rear wall are substantially planar.

6. The griddle of claim 1 wherein the first lower sidewall, the second lower sidewall and the lower rear wall comprise an integral single piece of material.

* * * * *